(12) United States Patent
Spangler et al.

(10) Patent No.: US 11,149,550 B2
(45) Date of Patent: Oct. 19, 2021

(54) BLADE NECK TRANSITION

(71) Applicant: UNITED TECHNOLOGIES CORPORATION, Farmington, CT (US)

(72) Inventors: Brandon W. Spangler, Vernon, CT (US); David R. Pack, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 135 days.

(21) Appl. No.: 16/270,080

(22) Filed: Feb. 7, 2019

(65) Prior Publication Data
US 2020/0256194 A1 Aug. 13, 2020

(51) Int. Cl.
F01D 5/18 (2006.01)
F01D 5/14 (2006.01)

(52) U.S. Cl.
CPC ............. F01D 5/141 (2013.01); F01D 5/187 (2013.01)

(58) Field of Classification Search
CPC ...................................................... F01D 5/141
See application file for complete search history.

(56) References Cited

U.S. PATENT DOCUMENTS

| 2,843,354 | A | * | 7/1958 | Smith | ...................... | F01D 5/188 416/92 |
| 4,407,632 | A | * | 10/1983 | Liang | ...................... | F01D 5/187 415/115 |
| 4,815,939 | A | | 3/1989 | Doble | | |
| 5,165,852 | A | | 11/1992 | Lee | | |
| 5,395,212 | A | | 3/1995 | Anzai et al. | | |
| 5,403,157 | A | | 4/1995 | Moore | | |
| 5,993,156 | A | * | 11/1999 | Bailly | ...................... | F01D 5/188 416/96 A |
| 6,126,396 | A | | 10/2000 | Doughty et al. | | |
| 6,206,638 | B1 | | 3/2001 | Glynn et al. | | |
| 6,213,714 | B1 | * | 4/2001 | Rhodes | ................... | F01D 5/186 416/96 R |
| 6,290,462 | B1 | * | 9/2001 | Ishiguro | .................. | F01D 5/187 416/97 R |
| 7,131,818 | B2 | | 11/2006 | Cunha et al. | | |
| 7,163,373 | B2 | * | 1/2007 | Liang | ........................ | F01D 5/18 415/115 |

(Continued)

FOREIGN PATENT DOCUMENTS

CN 1982655 6/2012
EP 1584790 10/2005

(Continued)

OTHER PUBLICATIONS

USPTO, Corrected Notice of Allowance dated Jun. 7, 2019 in U.S. Appl. No. 15/806,224.

(Continued)

Primary Examiner — Woody A Lee, Jr.
(74) Attorney, Agent, or Firm — Snell & Wilmer L.L.P.

(57) ABSTRACT

A blade for use with a gas turbine engine includes an attachment and an airfoil. The airfoil further includes a suction side wall configured to be exposed to less pressure than the pressure side wall during operation of the gas turbine engine. The blade also includes a plurality of intersecting ribs transitioning from an airfoil cross sectional geometry to an attachment cross section geometry.

27 Claims, 14 Drawing Sheets

(56) References Cited

U.S. PATENT DOCUMENTS

| | | | |
|---|---|---|---|
| 7,217,092 B2 | 5/2007 | Lee et al. | |
| 7,871,245 B2 | 1/2011 | Pietraszkiewicz et al. | |
| 9,120,144 B2 | 9/2015 | Lee | |
| 9,194,236 B2* | 11/2015 | Nakamata | F01D 5/187 |
| 9,638,057 B2* | 5/2017 | Kwon | F01D 25/12 |
| 10,036,258 B2* | 7/2018 | Mongillo | F01D 11/08 |
| 10,174,621 B2* | 1/2019 | Burd | F01D 5/18 |
| 10,378,364 B2 | 8/2019 | Spangler | |
| 2007/0031252 A1* | 2/2007 | Walters | F28F 13/08 416/97 R |
| 2007/0128034 A1 | 6/2007 | Lee et al. | |
| 2008/0290215 A1 | 11/2008 | Udall et al. | |
| 2009/0269210 A1 | 10/2009 | Pietraszkiewicz et al. | |
| 2009/0274549 A1* | 11/2009 | Mitchell | F01D 5/186 415/115 |
| 2010/0021308 A1 | 1/2010 | Rawlinson | |
| 2013/0294891 A1* | 11/2013 | Neuhaeusler | F01D 5/186 415/119 |
| 2016/0090844 A1 | 3/2016 | Auxier et al. | |
| 2017/0087631 A1* | 3/2017 | Gold | B22C 9/103 |
| 2017/0101871 A1* | 4/2017 | Tiedemann | F01D 9/065 |
| 2017/0173685 A1* | 6/2017 | Kittleson | F01D 5/18 |
| 2018/0031000 A1* | 2/2018 | Alban | F04D 29/526 |
| 2018/0050392 A1* | 2/2018 | Mason-Flucke | B22F 3/1055 |
| 2018/0202296 A1* | 7/2018 | Kiener | F01D 5/187 |
| 2018/0258779 A1* | 9/2018 | Boutaleb | F01D 9/065 |
| 2018/0347379 A1 | 12/2018 | Lewis | |
| 2019/0003311 A1* | 1/2019 | Brittingham | F01D 5/20 |
| 2019/0078446 A1* | 3/2019 | Scharl | F01D 5/188 |
| 2019/0101007 A1* | 4/2019 | Propheter-Hinckley | F01D 9/065 |
| 2019/0136699 A1 | 5/2019 | Spangler et al. | |

FOREIGN PATENT DOCUMENTS

| | | |
|---|---|---|
| EP | 1586738 | 10/2005 |
| EP | 1793085 | 6/2007 |
| EP | 2584146 | 4/2013 |
| EP | 3480432 | 5/2019 |
| WO | 2017009051 | 1/2017 |

OTHER PUBLICATIONS

USPTO, Notice of Allowance dated Apr. 12, 2019 in U.S. Appl. No. 15/806,224.

USPTO, Pre-Interview First Office Action dated Sep. 2, 2020 in U.S. Appl. No. 16/289,341.

USPTO, Notice of Allowance dated Oct. 7, 2020 in U.S. Appl. No. 16/289,341.

European Patent Office, European Search Report dated Feb. 2, 2021 in Application No. 20190322.6.

USPTO, Notice of Allowance dated Nov. 9, 2020 in U.S. Appl. No. 16/289,341.

European Patent Office, European Search Report dated Feb. 2, 2021 in Application No. 20190357.2.

* cited by examiner

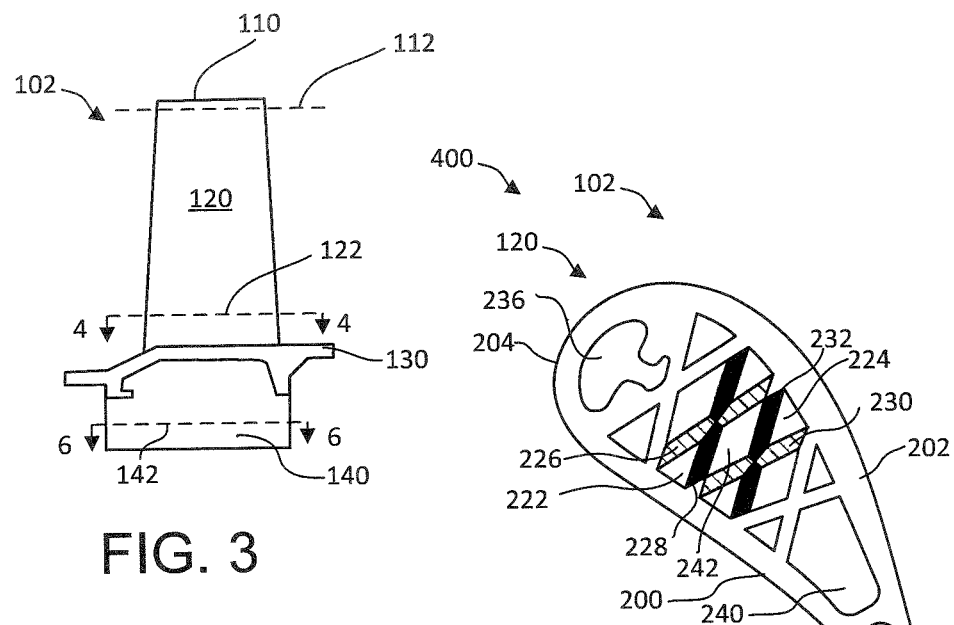
FIG. 3
FIG. 4A
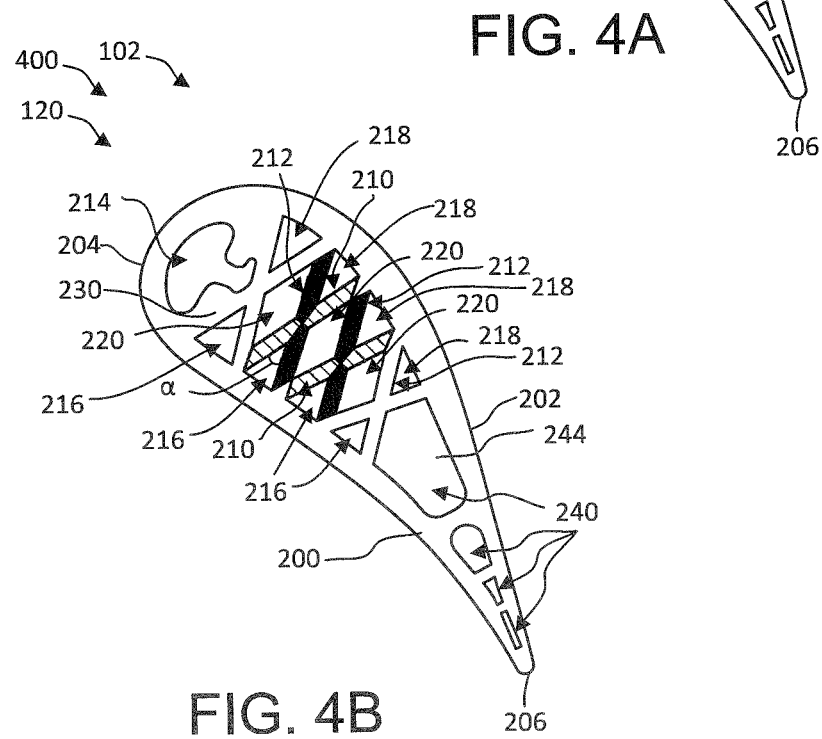
FIG. 4B

BLADE NECK TRANSITION

FIELD

The present disclosure relates generally to airfoils for use with gas turbine engines and, more particularly, to blades having internal ribs that transition from an attachment cross section to an airfoil cross section with multiple cavities to provide cooling airflow to the airfoils.

BACKGROUND

Gas turbine engines typically include a compressor section, a combustor section and a turbine section. The compressor section and the turbine section each have blades including rotating blades and stationary vanes. It may be desirable to provide a cooling (or heating, in the case of the compressor section) airflow through the airfoils of blades due to the relatively great temperatures at which they are operated. In that regard, the airfoils may include outer walls along with internal ribs or walls that form internal cavities through which a cooling airflow may flow from attachments coupled to the airfoils. The internal ribs may extend radially from an attachment end of a blade to a tip of an airfoil. Because the outer walls are exposed to relatively hot air, they may experience greater thermal expansion than the internal ribs or walls. Ribs designed for an airfoil may create a flexible structure in order to account for the thermal expansion of the outer walls; however, ribs designed for an attachment may create a stiff structure in order to prevent rib and attachment crushing. Such difference in thermal expansion design of an airfoil compared to stiffness design of an attachment present various obstacles in providing an efficient cooling system for turbine blades as the airfoil ribs transition to the attachment ribs.

SUMMARY

Described herein is a blade for use with a gas turbine engine. The blade may comprise a set of intersecting ribs extending from a first radial plane of an airfoil to second radial plane of an attachment proximate a root. The set of intersecting ribs may further comprise a radial airfoil cross sectional geometry at the first radial plane and a radial attachment cross sectional geometry at the second radial plane. The radial airfoil cross sectional geometry may be different from the radial attachment cross sectional geometry.

In various embodiments, the set of intersecting ribs may further comprise a set of airfoil ribs and a set of attachment ribs. The set of airfoil ribs may comprise a first airfoil rib and a second airfoil rib. The first airfoil rib may extend in a first direction within the radial airfoil cross sectional geometry. The second airfoil rib may extend in a second direction within the radial airfoil cross sectional geometry. The second direction may be different from the first direction. The set of attachment ribs may comprise a first attachment rib, a second attachment rib, and a third attachment rib. The first attachment rib may extend in a circumferential direction within the radial attachment cross sectional geometry. The second attachment rib may be disposed aft of the first attachment rib and extending in the circumferential direction within the radial attachment cross sectional geometry. The third attachment rib may be disposed between the first attachment rib and the second attachment rib and extending in an axial direction within the radial attachment cross sectional geometry. The set of airfoil ribs may extend radially inward from the radial airfoil cross sectional geometry and transition into the set of attachment ribs at the radial attachment cross sectional geometry.

In various embodiments, the set of intersecting ribs may comprise a first rib and a second rib. A first angle may be defined by an intersection of the first rib and the second rib. The first angle may increase as the set of intersecting ribs transitions from the first radial plane of the airfoil to the second radial plane of the attachment. The first rib and the second rib may define a second angle that decreases as the set of intersecting ribs transitions from the first radial plane of the airfoil to the second radial plane of the attachment. The second rib may have an angle that may increase as the set of intersecting ribs transitions from the second radial plane of the attachment to the first radial plane of the airfoil.

The first airfoil rib may transition into a first portion of the first attachment rib, a first portion of the second attachment rib, and a first portion of the third attachment rib. The second airfoil rib may transition into a second portion of the first attachment rib, a second portion of the second attachment rib, and a second portion of the third attachment rib. The first attachment rib may consist of the first portion of the first attachment rib and the second portion of the first attachment rib. The second attachment rib may consist of the first portion of the second attachment rib and the second portion of the second attachment rib. The third attachment rib may consist of the first portion of the third attachment rib and the second portion of the third attachment rib. The blade may further comprise an airfoil pressure wall, an airfoil suction wall, a first attachment wall, and second attachment wall disposed circumferentially opposite the first attachment wall. The first airfoil rib and the second airfoil rib may define a first triangular cavity with the airfoil pressure wall within the radial airfoil cross sectional geometry. The first airfoil rib and the second airfoil rib may define a second triangular cavity with the airfoil suction wall within the radial airfoil cross sectional geometry. The first attachment rib, the second attachment rib, the third attachment rib, and the first attachment wall may define a first quadrilateral shaped cavity. The first attachment rib, the second attachment rib, the third attachment rib, and the second attachment wall may define a second quadrilateral shaped cavity. The first triangular cavity may transition into the first quadrilateral shaped cavity and the second triangular cavity transitions into the second quadrilateral shaped cavity as the set of airfoil ribs transition to the set of attachment ribs.

The rib may partially define a cavity that is further defined by a first set of control points around a first perimeter of the cavity in the radial airfoil cross sectional geometry and a second set of control points around a second perimeter of the cavity in the radial attachment cross sectional geometry. A first control point subset of the first set of control points may transition from a first substantially non-linear shape at the first radial plane in the radial airfoil cross sectional geometry to a first substantially linear shape defined by a second control point subset of the second set of control points in the radial attachment cross sectional geometry at the second radial plane. The second set of control points may form a side of the cavity in the attachment. A third control point subset of the first set of control points may transition from a second substantially linear shape in the radial airfoil cross sectional geometry to a second substantially non-linear shape that may be defined by a fourth control point subset of the second set of control points at the radial attachment cross sectional geometry. The first perimeter of the cavity may be 3-sided and the second perimeter of the cavity may be 4-sided.

Described herein is a blade. The blade may comprise an airfoil, an attachment, a first set of internal ribs, a second set of internal ribs, a third set of internal ribs, and a fourth set of internal ribs. The airfoil may have a leading edge and a trailing edge. The first set of intersecting internal ribs may define a first angle that increases as the first set of intersecting internal ribs extend radially inward from the airfoil to the attachment. The second set of intersecting internal ribs may be disposed aft of the first set of intersecting internal ribs. The third set of intersecting internal ribs may be disposed aft of the second set of intersecting internal ribs. The fourth set of intersecting internal ribs may be disposed aft of the third set of intersecting internal ribs.

In various embodiments, the first set of internal ribs may further comprise a set of airfoil ribs and a set of attachment ribs. The airfoil rib may comprise a first airfoil rib and a second airfoil rib. The airfoil rib may comprise a first airfoil rib and a second airfoil rib. The first airfoil rib may extend in a first direction within the radial airfoil cross sectional geometry. The second airfoil rib may extend in a second direction within the radial airfoil cross sectional geometry. The second direction may be different from the first direction. The set of attachment ribs may comprise a first attachment rib, a second attachment rib, and a third attachment rib. The first attachment rib may extend in a circumferential direction within the radial attachment cross sectional geometry. The second attachment rib may be disposed aft of the first attachment rib and extending in the circumferential direction within the radial attachment cross sectional geometry. The third attachment rib may be disposed between the first attachment rib and the second attachment rib and extending in an axial direction within the radial attachment cross sectional geometry. The airfoil rib may extend radially inward from the radial airfoil cross sectional geometry and transition into the set of attachment ribs at the radial attachment cross sectional geometry.

In various embodiments, the first set of intersecting internal ribs may further comprise a first rib aft surface. The second set of intersecting internal ribs may further comprise a second rib forward surface. The first rib aft surface and the second rib forward surface may define a first internal cavity. The first internal cavity may have a substantially parallelogram shape in the radial airfoil cross sectional geometry. The first internal cavity may have a quadrilateral shaped shape in the radial attachment cross sectional geometry. The first airfoil rib may transition into a first portion of the first attachment rib, a first portion of the second attachment rib, and a first portion of the third attachment rib. The second airfoil rib may transition into a second portion of the first attachment rib, a second portion of the second attachment rib, and a second portion of the third attachment rib. The first attachment rib may consist of the first portion of the first attachment rib and the second portion of the first attachment rib. The second attachment rib may consist of the first portion of the second attachment rib and the second portion of the second attachment rib. The third attachment rib may consist of the first portion of the third attachment rib and the second portion of the third attachment rib. The first angle may be acute at a first radial plane in the airfoil. The first angle may approach 180 degrees at a second radial plane of the attachment. A second angle may be defined by an intersection of the first set of intersecting internal ribs and the second set of intersecting internal ribs. The second angle may increase as the first set of intersecting internal ribs and the second set of intersecting internal ribs extend from a first radial plane of the airfoil to a second radial plane of the attachment. The second angle may approach 90 degrees at the second radial plane of the attachment.

Described herein is a gas turbine engine. The gas turbine engine may comprise a turbine rotor. The turbine rotor may comprise a blade. The blade may comprise an airfoil, an attachment, a first set of intersecting internal ribs, a second set of intersecting internal ribs, a third set of intersecting internal ribs, and a fourth set of intersecting internal ribs. The airfoil may have a leading edge and a trailing edge. The first set of intersecting internal ribs may define a first angle that increases as the first set of intersecting internal ribs extend radially inward from the airfoil to the attachment. The second set of intersecting internal ribs may be disposed aft of the first set of intersecting internal ribs. The third set of intersecting internal ribs may be disposed aft of the second set of intersecting internal ribs. The fourth set of intersecting internal ribs may be disposed aft of the third set of intersecting internal ribs.

In various embodiments, the first set of intersecting internal ribs may further comprise a set of airfoil ribs and a set of attachment ribs. The airfoil rib may comprise a first airfoil rib and a second airfoil rib. The airfoil rib may comprise a first airfoil rib and a second airfoil rib. The first airfoil rib may extend in a first direction within the radial airfoil cross sectional geometry. The second airfoil rib may extend in a second direction within the radial airfoil cross sectional geometry. The second direction may be different from the first direction. The set of attachment ribs may comprise a first attachment rib, a second attachment rib, and a third attachment rib. The first attachment rib may extend in a circumferential direction within the radial attachment cross sectional geometry. The second attachment rib may be disposed aft of the first attachment rib and extending in the circumferential direction within the radial attachment cross sectional geometry. The third attachment rib may be disposed between the first attachment rib and the second attachment rib and extending in an axial direction within the radial attachment cross sectional geometry. The airfoil rib may extend radially inward from the radial airfoil cross sectional geometry and transition into the set of attachment ribs at the radial attachment cross sectional geometry.

In various embodiments, the blade may further comprise an airfoil pressure wall and an airfoil suction wall. The first airfoil rib and the second airfoil rib may define a first triangular cavity with the airfoil pressure wall within the radial airfoil cross sectional geometry. The first airfoil rib and the second airfoil rib may define a second triangular cavity with the airfoil suction wall within the radial airfoil cross sectional geometry. The blade may further comprise a first attachment wall and a second attachment wall disposed circumferentially opposite the first attachment wall. The first attachment rib, the second attachment rib, the third attachment rib, and the first attachment wall may define a first quadrilateral shaped cavity. The first attachment rib, the second attachment rib, the third attachment rib, and the second attachment wall may define a second quadrilateral shaped cavity. The first triangular cavity may transition into the first quadrilateral shaped cavity. The second triangular cavity may transition into the second quadrilateral shaped cavity as the airfoil rib transitions to the set of attachment ribs.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

FIG. 3 is a cross-sectional view of a portion of a high pressure turbine section of the gas turbine engine of FIG. 1, in accordance with various embodiments;

FIGS. 4A and 4B illustrate an airfoil radial cross section of an airfoil, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
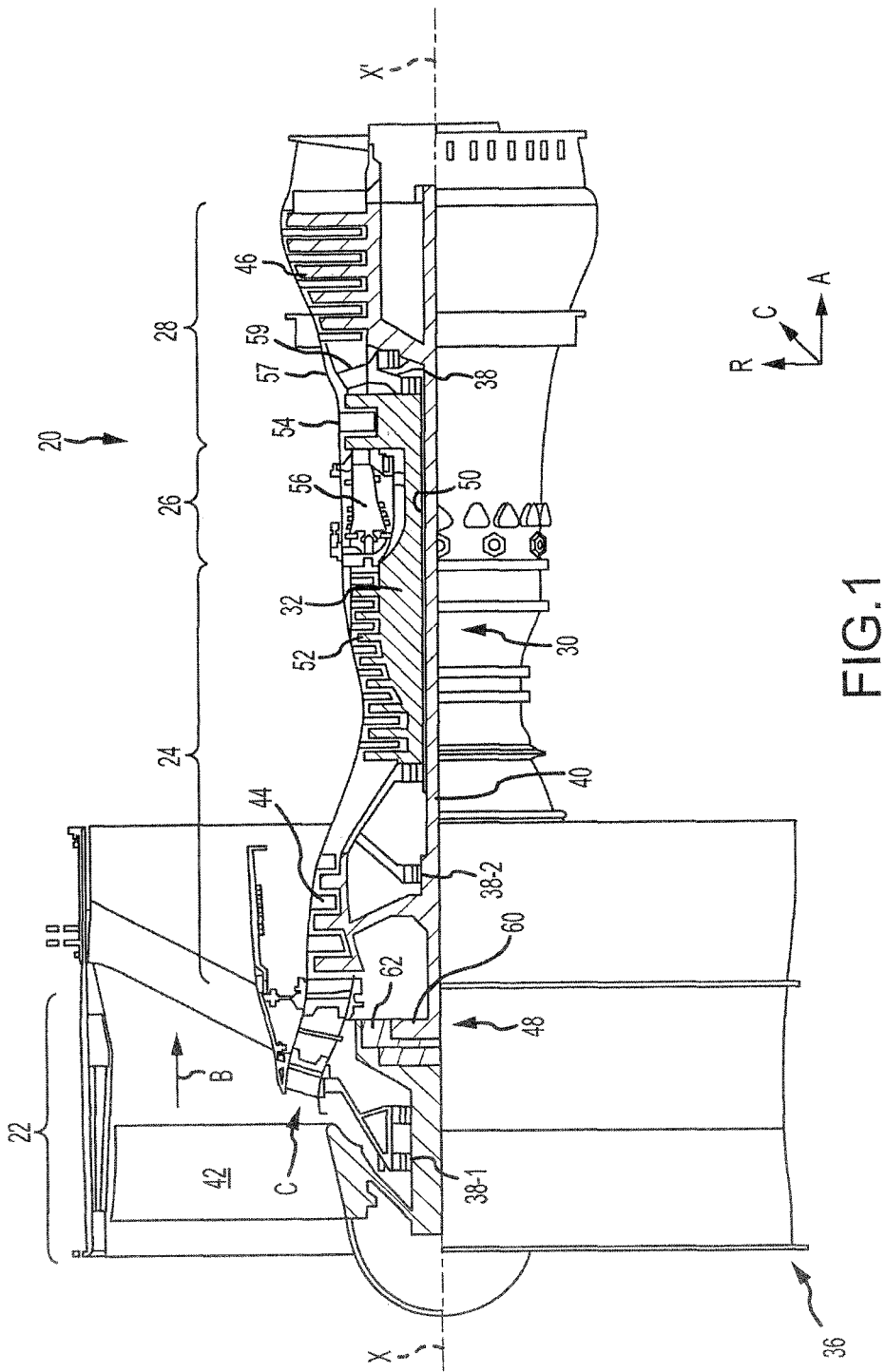
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures and turboshaft or industrial gas turbines with one or more spools.

The gas turbine engine 20 generally comprise a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear housing 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
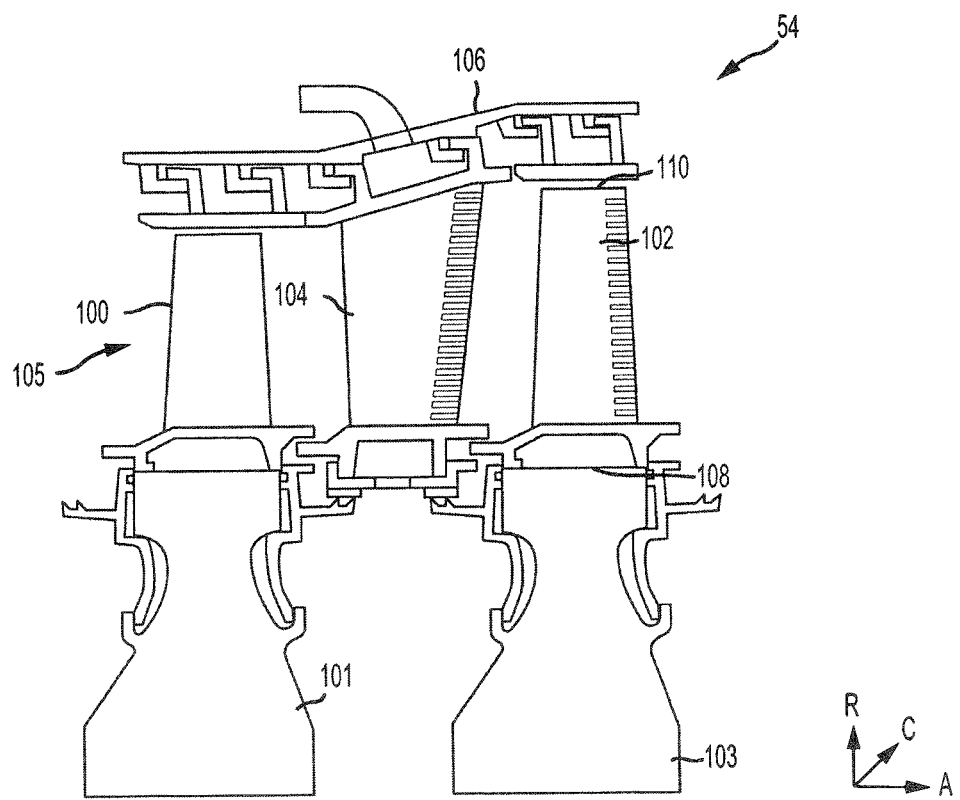
FIG. 2 is a cross-sectional view of a portion of a high pressure turbine section of the gas turbine engine of FIG. 1, in accordance with various embodiments.

Referring now to FIGS. 1 and 2, the high pressure turbine section 54 may include multiple blades 105 including multiple rows, or stages, of blades including a first blade 100 and a second blade 102, along with rows, or stages, of vanes located therebetween including a vane 104. The blades 100, 102 may be coupled to disks 101, 103 respectively which facilitate rotation of the blades 100, 102 about the axis X-X'. The vane 104 may be coupled to a case 106 and may remain stationary relative to the axis X-X'.

The blade 102 may include an inner diameter edge 108 and an outer diameter edge 110. Due to relatively high temperatures within the high pressure turbine section 54, it may be desirable for the blade 102 (and the vane 104) to receive a flow of cooling air. In that regard, the blade 102 may receive a cooling airflow from the inner diameter edge 108 or the outer diameter edge 110. The blade 102 may define cavities that transport the cooling airflow through the blade 102 to the other of the inner diameter edge 108 or the outer diameter edge 110.

Improved cooling passages will be described throughout the disclosure with reference to the blade 102. However, one skilled in the art will realize that the cooling passage design implemented in the blade 102 may likewise be implemented in the vane 104, or any airfoil (including a rotating blade or stationary vane) in any portion of the compressor section 24 or the turbine section 28.

Referring now to FIG. 3, a side view of a blade 102, in accordance with various embodiments, is illustrated. The blade 102 may comprise an airfoil 120 extending radially outward from a platform 130, and an attachment 140 extending radially inward from the platform 130. A radial airfoil plane 122 is defined by the cross section 4-4 taken proximate the inner diameter of airfoil 120. A radial attachment plane 142 is defined by the cross section 6-6 taken proximate the root of the attachment 140. Referring back to FIG. 2, the attachment 140 may be coupled to disk 101.

Referring now to FIGS. 4A and 4B, an airfoil cross sectional geometry 400 of radial airfoil plane 122, in accordance with various embodiments, is illustrated. The airfoil 120 may include a pressure side wall 200 and a suction side wall 202. The pressure side wall 200 may receive a hot airflow from the combustor section 26 of the gas turbine engine 20 of FIG. 1. In that regard, the pressure side wall 200 may be exposed to greater pressure than the suction side wall 202 during operation of the gas turbine engine 20 of FIG. 1. The hot airflow may cause the blade 102 to rotate about the A axis.

The airfoil 120 may also include a leading edge 204 and a trailing edge 206. The leading edge 204 may be located axially forward of the trailing edge 206 and may receive the hot airflow prior to the trailing edge 206.

The airfoil 120 may include a plurality of airfoil ribs (210,212) that may define a plurality of cavities (216, 218, 220, 214, 240). In particular, the blade 102 may include a first plurality of ribs 210 oriented in a first direction and a second plurality of ribs 212 oriented in a second direction that may differ from the first direction in radial airfoil plane 122 of airfoil 120. The plurality of airfoil ribs 210, 212 may intersect to define, or partially define multiple cavities within the blade 102. The multiple cavities may receive a cooling airflow to reduce a temperature of the blade 102. In some embodiments, as shown in FIG. 4A and FIG. 4B, one or more of the first plurality of ribs may intersect one or more of the second plurality of ribs to form an X-shape.

With regards to the airfoil cross sectional geometry 400, the first plurality of ribs 210 may be oriented at an angle α relative to the second plurality of ribs 212 in radial airfoil plane 122 of airfoil 120. In various embodiments, the angle α may be between 30 degrees and 150 degrees. In various embodiments, each of the plurality of airfoil ribs (210, 212) may contact at least one of the pressure side wall 200 or the suction side wall 202 and the airfoil ribs (210, 212) may not extend all the way to the opposing pressure side or suction side wall, creating triangular passages adjacent to only one of the pressure side wall 200 or suction side wall 202. Although referred to as triangular, the corners of triangular passages may be rounded. Additionally, the triangular passages may more closely resemble a circular sector being relatively concentric with either the suction side wall 202 or pressure side wall 200. In various embodiments, each of the plurality of airfoil ribs (210, 212) may extend from the pressure side wall 200 to the suction side wall 202. In that regard, the plurality of airfoil ribs (210, 212) may form a modified truss structure that defines the multiple cavities in airfoil 120 including a first plurality of triangular cavities 216, a second plurality of triangular cavities 218, and a plurality of internal cavities 220 extending radially outward from radial airfoil plane 122 to proximate the tip 110 from FIG. 1. In various embodiments, the internal cavities 220 may be quadrilateral shaped. In various embodiments, the internal cavities 220 may be substantially parallelogram shaped, where substantially in this context only means opposite sides are plus or minus 15 degrees from being parallel, in radial airfoil plane 122 of airfoil 120. The plurality of airfoil ribs (210,212) may further form a leading edge cavity 236. The plurality of airfoil ribs (210,212) may further form one or more trailing edge cavities 240 including a pentagonal cavity 244 in radial airfoil plane 122 of airfoil 120.

The multiple cavities (214, 216, 218, 220, 240) may be oriented in such a way as to segregate the cooling flows into different regions. For example, the first plurality of triangular cavities 216 may transport a pressure side cooling airflow, and the second plurality of triangular cavities 218 may transport a suction side cooling airflow. Likewise and with brief reference to FIGS. 2, 4A, and 4B, the internal cavities 220 may function as tip feed passages to transport cooling air from the inner diameter edge 108 to the outer diameter edge 110 of the blade 102. Because the internal cavities 220 are bordered by ribs only instead of the pressure side wall 200 or the suction side wall 202, the cooling airflow traveling through the internal cavities 220 remains relatively cool. In that regard, the internal cavities 220 may provide relatively cool air to the inner diameter edge 108 and/or the outer diameter edge 110 of the blade.

The leading edge cavity 236 may transport a leading edge cooling airflow. Similarly, the one or more trailing edge cavities 240 may transport a trailing edge cooling airflow.

The first plurality of triangular cavities 216 may each be bordered by a combination of one or more of the plurality of airfoil ribs (210,212) and the pressure side wall 200. For example, the first plurality of triangular cavities 216 may include a first triangular cavity 222. The first triangular cavity 222 may have a first wall that is defined by a first airfoil rib 226, a second wall that is defined by a second airfoil rib 228, and a third wall that is defined by the pressure side wall 200.

The second plurality of triangular cavities 218 may each be bordered by a combination of one or more of the plurality of airfoil ribs (210,212) and the suction side wall 202. For example, the second plurality of triangular cavities 218 may include a second triangular cavity 224. The second triangular cavity 224 may have a first wall that is defined by a third airfoil rib 230, a second wall that is defined by a fourth airfoil rib 232, and a third wall that is defined by the suction side wall 202.

The internal cavities 220 may be bordered entirely by three or more ribs of the plurality of airfoil ribs (210,212). For example, the internal cavities 220 may include a first internal cavity 242 that is bordered entirely by airfoil ribs (210,212). In particular, the first internal cavity 242 has four sides, each defined by one of the first airfoil rib 226, the second airfoil rib 228, the third airfoil rib 230, and the fourth airfoil rib 232.

Referring back to FIG. 3, the plurality of ribs generally maintains the airfoil cross sectional geometry 400 from the radial airfoil plane 122 proximate the platform 130 radially outward to a tip plane 112 proximate the tip 110 of airfoil 120.

Turning to FIGS. 4A, 4B, 5A, 5B, and 5C, the plurality of airfoil ribs (210,212) are oriented in such a manner as to facilitate expansion of the pressure side wall 200 and the suction side wall 202 that occurs as the airfoil 120 is exposed to hot exhaust from the combustor section 26 of FIG. 1. In particular, the modified truss structure formed by the first plurality of airfoil ribs 210 and the second plurality of ribs 212 that form the angle α therebetween facilitates such expansion. For example, the first triangular cavity 222 is defined between the first airfoil rib 226, the second airfoil rib 228, and the pressure side wall 200. Because the airfoil ribs 226, 228 are internal to the airfoil 120, they are exposed to less heat than the pressure side wall 200. In that regard, the pressure side wall 200 may experience greater thermal expansion than the airfoil ribs 226, 228.

Figure 5A:
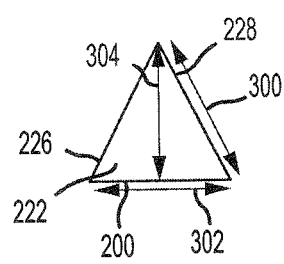
FIGS. 5A, 5B, and 5C illustrate interaction between a pressure side wall and the ribs of the airfoil of FIGS. 4A and 4B, along with changes in internal cavity shapes, due to thermal expansion of the pressure side wall, in accordance with various embodiments.
Figure 5B:
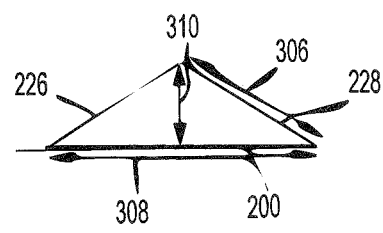
Figure 5C:
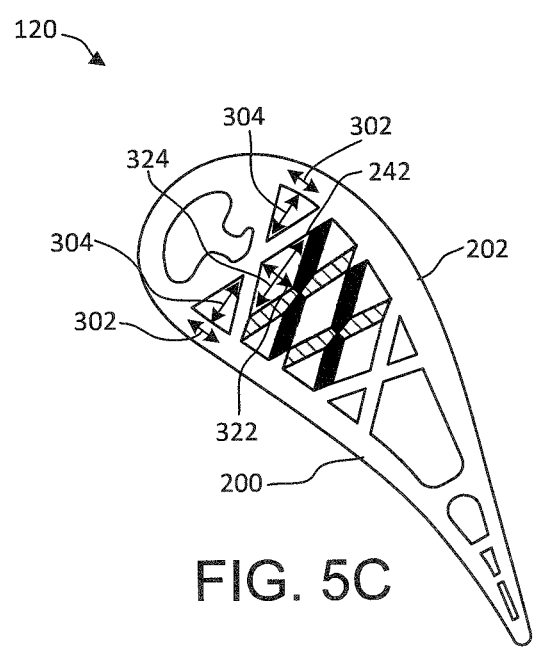

The modified truss structure formed by the plurality of airfoil ribs (210,212) facilitates this thermal expansion of the pressure side wall 200 with relatively little tensile and compressive stress between the plurality of airfoil ribs (210,212), the pressure side wall 200, and the suction side wall 202. As shown in FIG. 5A and when the airfoil 120 is exposed to relatively cool air, the first airfoil rib 226 and the second airfoil rib 228 may define sides having a first rib distance 300, and the pressure side wall 200 may define a side having a first outer wall distance 302. In various embodiments, the first outer wall distance 302 may be less than, equal to, or greater than the first rib distance. In FIG. 5B when the blade 102 is exposed to relatively hot air, the first airfoil rib 226 and the second airfoil rib 228 may define sides having a second rib distance 306, and the pressure side wall 200 may define a side having a second outer wall distance 308.

Due to the exposure to the hot airflow, the pressure side wall 200 may experience relatively large thermal expansion. In that regard, the second outer wall distance 308 of the pressure side wall 200 in a relatively hot state may be significantly greater than the first outer wall distance 302 of the pressure side wall in a relatively cool state. Due to the transfer of heat from the pressure side wall 200 to the first airfoil rib 226 and the second airfoil rib 228, the second rib distance 306 may be greater than the first rib distance 300. However, because the airfoil ribs 226, 228 are not exposed to the hot airflow, the difference between the first outer wall distance 302 and the second outer wall distance 308 is more than the difference between the first rib distance 300 and the second rib distance 306.

This greater expansion of the pressure side wall 200 relative to the airfoil ribs 226, 228 is facilitated by the modified truss structure. This is because the triangular shape of the first triangular cavity 222 changes in response to the thermal expansion of the pressure side wall 200 such that a first passage height 304 in the relatively cool state becomes reduced to a second passage height 310 when the blade 102 is exposed to the hot airflow. In that regard, the changing dimensions of the first triangular cavity 222 reduce compressive or tensile stresses experienced between the airfoil ribs 226, 228 and the pressure side wall 200.

Likewise, the substantially parallelogram shaped internal cavity 242 changes shape, with a distance 324 between the pressure side wall 200 and the suction side wall 202 being reduced and the distance 322 between the internal cavity 242 leading edge and the internal cavity 242 trailing edge increasing. This provides advantages over conventional blades which experience significant compressive and tensile stresses caused by the stiff box structure created between the hot outer pressure and suction side walls and the cold internal ribs and parallel inner walls.

Airfoil cross sectional geometry 400 provides the benefits above to an airfoil 120 of a blade 102. However, the attachment of a blade requires a stiff structure that the airfoil cross sectional geometry 400 cannot provide. Therefore, by transitioning the airfoil structure in airfoil cross sectional geometry 400 to the attachment structure of FIGS. 6A and 6B, stiffness may be enhanced in the attachment.

Figure 6A:
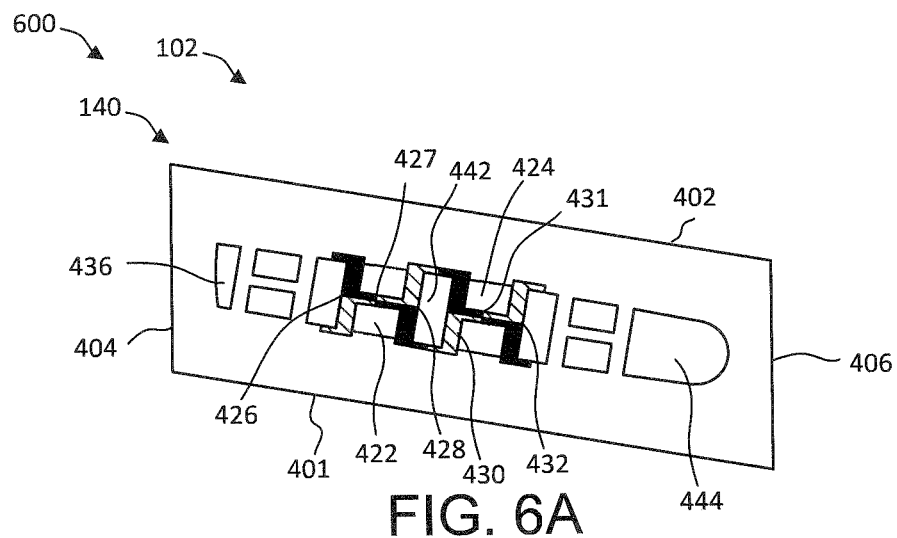
FIGS. 6A and 6B illustrate a radial attachment cross section of an attachment of a blade, in accordance with various embodiments.
Figure 6B:
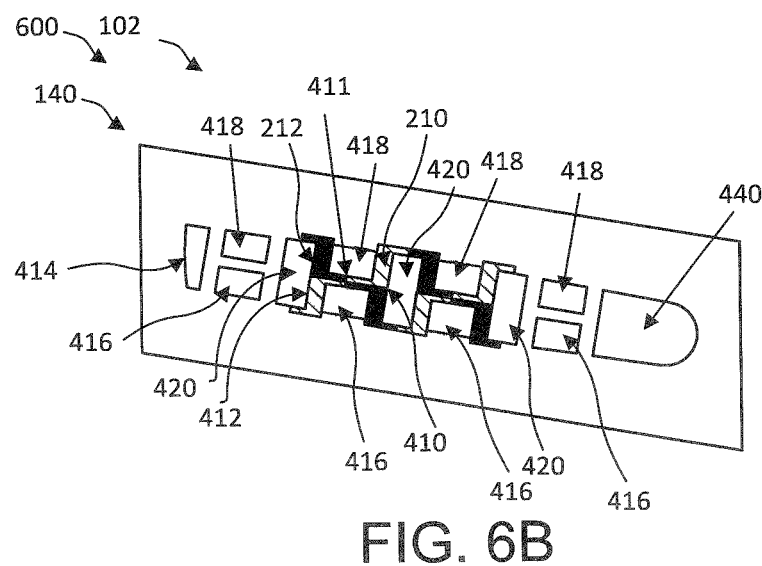

Referring now to FIGS. 3, 6A and 6B, an attachment cross sectional geometry 600 of radial attachment plane 142, in accordance with various embodiments, is illustrated. The attachment 140 may include a first circumferential wall 401 and a second circumferential wall 402. The attachment 140 may also include a forward wall 404 and an aft wall 406. The forward wall 404 may be located axially forward of the aft wall 406.

Referring now to FIGS. 3, 4A, 4B, 6A, and 6B and 7A, the first circumferential wall 401 may extend radially outward from radial attachment plane 142 and transition in shape to pressure side wall 200 at radial airfoil plane 122. Similarly, the second circumferential wall 402 may extend radially outward from radial attachment plane 142 and transition in shape to suction side wall 202 at radial airfoil plane 122, the forward wall 404 may extend radially outward from radial attachment plane 142 and transition in shape to leading edge 204 at radial airfoil plane 122, and the aft wall 406 may extend radially outward from radial attachment plane 142 and transition in shape to trailing edge 206 at radial attachment plane 142.

The attachment 140 may include a plurality of attachment ribs (410, 411, 412) that define multiple cavities (414, 416, 418, 420, 440) therebetween. In particular, the attachment 140 may include a plurality of aft circumferential ribs 410, a plurality of axial ribs 411, and a plurality of forward circumferential ribs 412. In some embodiments, as shown in FIG. 6A and FIG. 6B, an aft circumferential rib 410, an axial rib 411, and a forward circumferential rib 412 intersect to form an H-shape. Each rib 210 may form a portion of a forward circumferential rib 412, a portion of an aft circumferential rib 410, and a portion of an axial rib 411 disposed between forward circumferential rib 412 and aft circumferential rib 410 upon transitioning from the radial airfoil plane 122 to the radial attachment plane 142. Similarly, each rib 212 may form a portion of forward circumferential rib 412, a portion of aft circumferential rib 410, and a portion of axial rib 411 in radial attachment plane 142 of attachment 140. By providing stiff circumferential ribs in the attachment, the attachment may have increased strength and the blade may have greater part life due to decreased stress. By transitioning from intersecting airfoil ribs (210,212) in the airfoil 120 to circumferential/axial attachment ribs (410,411,412) in the attachment 140), the airfoil may be able to greater handle thermal loads, and the attachment may have greater stiffness and prevent collapsing of the attachment.

With regards to the attachment cross sectional geometry 600, the plurality of forward circumferential ribs 412 may be oriented in a circumferential direction. Similarly, the plurality of aft circumferential ribs 410 may be oriented in a circumferential direction. The plurality of axial ribs 411 may be oriented in an axial direction and be substantially perpendicular to the plurality of aft circumferential ribs 410 and the forward circumferential ribs 412. In this context only, the term substantial may refer to plus or minus 15 degrees. In that regard, the plurality of attachment ribs (410,411,412) may form a structure that defines multiple cavities (414,416, 418,420,440) in attachment 140 including a first plurality of rectangular cavities 416 that extend radially outward from radial attachment plane 142 and transition into the plurality of triangular cavities 216 in radial airfoil plane 122, a second plurality of rectangular cavities 418 that extend radially outward from radial attachment plane 142 and transition into a second plurality of triangular cavities 218 in radial airfoil plane, and a third plurality of rectangular cavities 420 that extend radially outward from radial attachment plane 142 and transition into the plurality of internal cavities 220.

In various embodiments, rectangular cavities 420 in radial attachment plane 142 transition into internal cavities 220 that are substantially parallelogram shaped, where substantially means opposite sides are plus or minus 15 degrees from being parallel, in radial airfoil plane 122. The plurality of attachment ribs (410,411,412) may further form a forward cavity 436 in radial attachment plane 142 that extends radially outward to form leading edge cavity 236 in radial airfoil plane 122. The plurality of attachment ribs (410,411, 412) may further form an aft cavity 440 in radial attachment plane 142 including a cavity 444 that extends radially outward and transitions into pentagonal cavity 244 in radial airfoil plane 122 of airfoil 120.

The multiple cavities (214 to 414, 216 to 416, 218 to 418, 220 to 420, 240 to 440) may be oriented in such a way as to segregate the cooling flows into different regions. For example, the first plurality of cavities (triangular cavities 216 transitioning to rectangular cavities 416) may transport a pressure side cooling airflow, and the second plurality of cavities (triangular cavities 218 transitioning to rectangular cavities 418) may transport a suction side cooling airflow. Likewise, the third plurality of cavities (internal cavities 220 transitioning into rectangular cavities 420) may function as tip feed passages to transport cooling air from the inner diameter edge 108 to the outer diameter edge 110 of the blade 102.

The forward cavity 436 may transport a cooling airflow from within attachment 140 in a radially outward direction through leading edge cavity 236. Similarly, an aft cavity 440 may transport a cooling airflow through the one or more trailing edge cavities 240.

The first plurality of rectangular cavities 416 may each be bordered by a combination of one or more of the plurality of attachment ribs (410,411,412) and the first circumferential wall 401. For example, the first plurality of rectangular cavities 416 may include a first rectangular cavity 422. The first rectangular cavity 422 may have a first wall that is defined by a first attachment rib 426, a second wall that is defined by a second attachment rib 427, a third wall defined by a third attachment rib 428, and a fourth wall that is defined by the first circumferential wall 401. The first rectangular cavity 422 may extend radially outward from radial attachment plane 142 and transition into first triangular cavity 222 in radial airfoil plane 122. Referring to FIGS. 3, 4A, and 6A, as first airfoil rib 226 extends radially inward from radial airfoil plane 122, first airfoil rib 226 transitions into a portion of first attachment rib 426, a portion of second attachment rib 427 and a portion of third attachment rib 428. Similarly, as second airfoil rib 228 extends radially inward from radial airfoil plane 122, second airfoil rib 228 transitions into a portion of first attachment rib 426, a portion of second attachment rib 427, and a portion of third attachment rib 428.

The second plurality of rectangular cavities 418 may each be bordered by a combination of one or more of the plurality of attachment ribs (410,411,412) and the second circumferential wall 402. For example, the second plurality of rectangular cavities 418 may include a second rectangular cavity 424. The second rectangular cavity 424 may have a first wall that is defined by a fourth attachment rib 430, a second wall that is defined by a fifth attachment rib 431, a third wall that is defined by a sixth attachment rib 432 and a fourth wall that is defined by the second circumferential wall 402. The second rectangular cavity 424 may extend radially outward from radial attachment plane 142 and transition into second triangular cavity 224 in radial airfoil plane 122. Referring to FIGS. 3, 4A, and 6A, as third airfoil rib 230 extends radially inward from radial airfoil plane 122, third airfoil rib 230 transitions into a portion of fourth attachment rib 430, a portion of fifth attachment rib 431 and a portion of sixth attachment rib 432. Similarly, as fourth airfoil rib 232 extends radially inward from radial airfoil plane 122, fourth airfoil rib 232 transitions into a portion of fourth attachment rib 430, a portion of fifth attachment rib 431, and a portion of sixth attachment rib 432.

The third plurality of rectangular cavities 420 may be bordered entirely by two or more ribs of the plurality of attachment ribs (410,411,412), the first circumferential side 401 and the second circumferential side 402. For example, the third plurality of rectangular cavities 420 may include a third rectangular cavity 442 that is bordered by attachment ribs (410,411,412). In particular, the third rectangular cavity 442 is bordered by third attachment rib 428 and fourth attachment rib 430, as well as first circumferential side 401 and second circumferential side 402. The third rectangular cavity 442 may extend radially outward from radial attachment plane 142 and transition into first internal cavity 242 in radial airfoil plane 122. Referring to FIGS. 3, 4A, and 6A, as fourth attachment rib 430 extends radially outward from radial attachment plane 142, fourth attachment rib 430 transitions into a portion of third airfoil rib 230 and fourth airfoil rib 232. Similarly, as third attachment rib 428 extends radially outward from radial attachment plane 142, third attachment rib 428 transitions into a portion of first airfoil rib 226 and second airfoil rib 228 in radial airfoil plane 122.

Figure 7A:
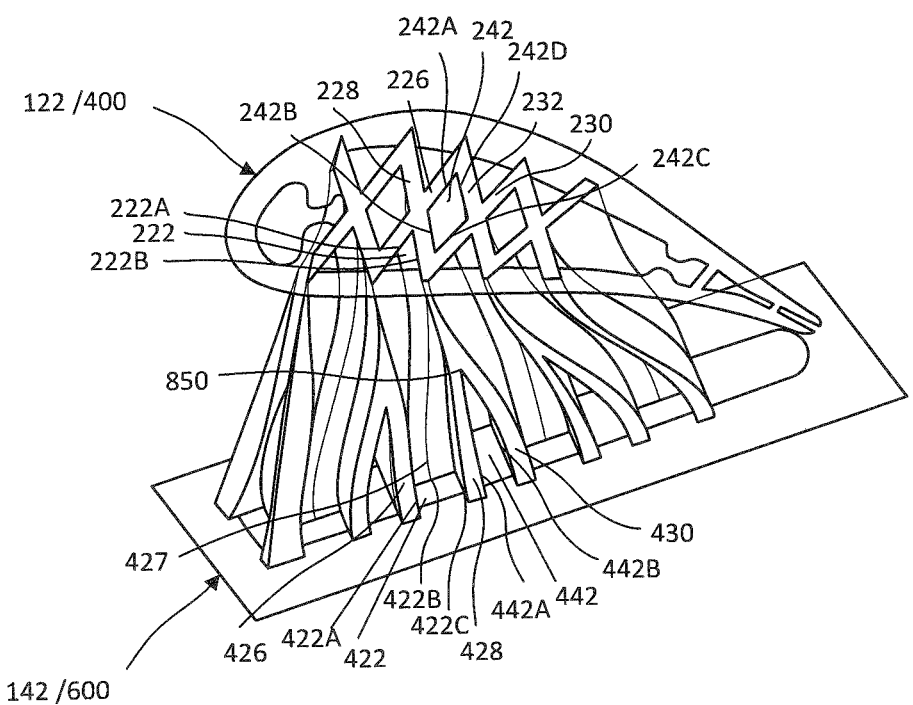
FIG. 7A, illustrates an orthogonal view of a plurality of ribs extending from a radial attachment cross section to a radial airfoil cross section of a blade, in accordance with various embodiments.

Referring now to FIGS. 3 and 7A, a rib transition from a radial airfoil plane 122 to a radial attachment plane 142 is shown in accordance with various embodiments. As shown in FIG. 7A, the airfoil cross sectional geometry 400 found in FIGS. 4A, 4B may transition radially inward to the attachment cross sectional geometry 600 found in FIGS. 6A, and 6B. As shown, first airfoil rib 226 may partially define a first airfoil surface 242A of first internal cavity 242 in radial airfoil plane 122. Second airfoil rib 228 may partially define a second airfoil surface 242B of internal cavity 242 in radial airfoil plane 122. Third airfoil rib 230 may partially define a third airfoil surface 242C of internal cavity 242 in radial airfoil plane 122. Fourth airfoil rib 232 may partially define a fourth airfoil surface 242D of internal cavity 242 in radial airfoil plane 122. Internal cavity 242 may comprise the first airfoil surface 242A, the second airfoil surface 242B, the third airfoil surface 242C, and the fourth airfoil surface 242D. Similarly, third attachment rib 428 may define a third attachment surface 442A partially defining third rectangular cavity 442 in radial attachment plane 142, and fourth attachment rib 430 may define a fourth attachment surface 442B. In various embodiments, the first airfoil surface 242A and the second airfoil surface 242B may transition from radial airfoil plane 122 to third attachment surface 442A. Similarly, third airfoil surface 242C and fourth airfoil surface 242D may transition from radial airfoil plane 122 to fourth attachment surface 442B in radial attachment plane 142. Additionally, at the radial airfoil plane 122, second airfoil rib 228 is arranged such that one end of the rib intersects one end of the third airfoil rib 230. Similarly, the first airfoil rib 226 is arranged such that one end of the rib intersects one end of the fourth airfoil rib 232. As these ribs transition from radial airfoil plane 122 to radial attachment plane 142, the ends of the ribs separate to form a wishbone shape 850 prior to forming third attachment rib 428 and fourth attachment rib 430 in radial attachment plane 142. This transition may ensure that the attachment has increased stiffness and the airfoil has flexibility for thermal growth on the outer walls of the airfoil.

In various embodiments, first airfoil rib 226 and second airfoil rib 228 may partially define first triangular cavity 222. First airfoil rib 226 may define first triangular surface 222A and second airfoil rib 228 may define second triangular surface 222B. Similarly, first attachment rib 426 may define first rectangular surface 422A, second attachment rib 427 may define second rectangular surface 422B, and third attachment rib 428 may define third rectangular surface 422C. Additionally, first triangular surface 222A may transition from radial airfoil plane 122 to first rectangular surface 422A and partially second rectangular surface 422B in radial attachment plane 142. Similarly, second triangular surface 222B may transition from radial airfoil plane 122 to partially second rectangular surface 422B and third rectangular surface 422C. This transition may ensure that the attachment has increased stiffness and the airfoil has flexibility for thermal growth on the outer walls of the airfoil.

Figure 7B:
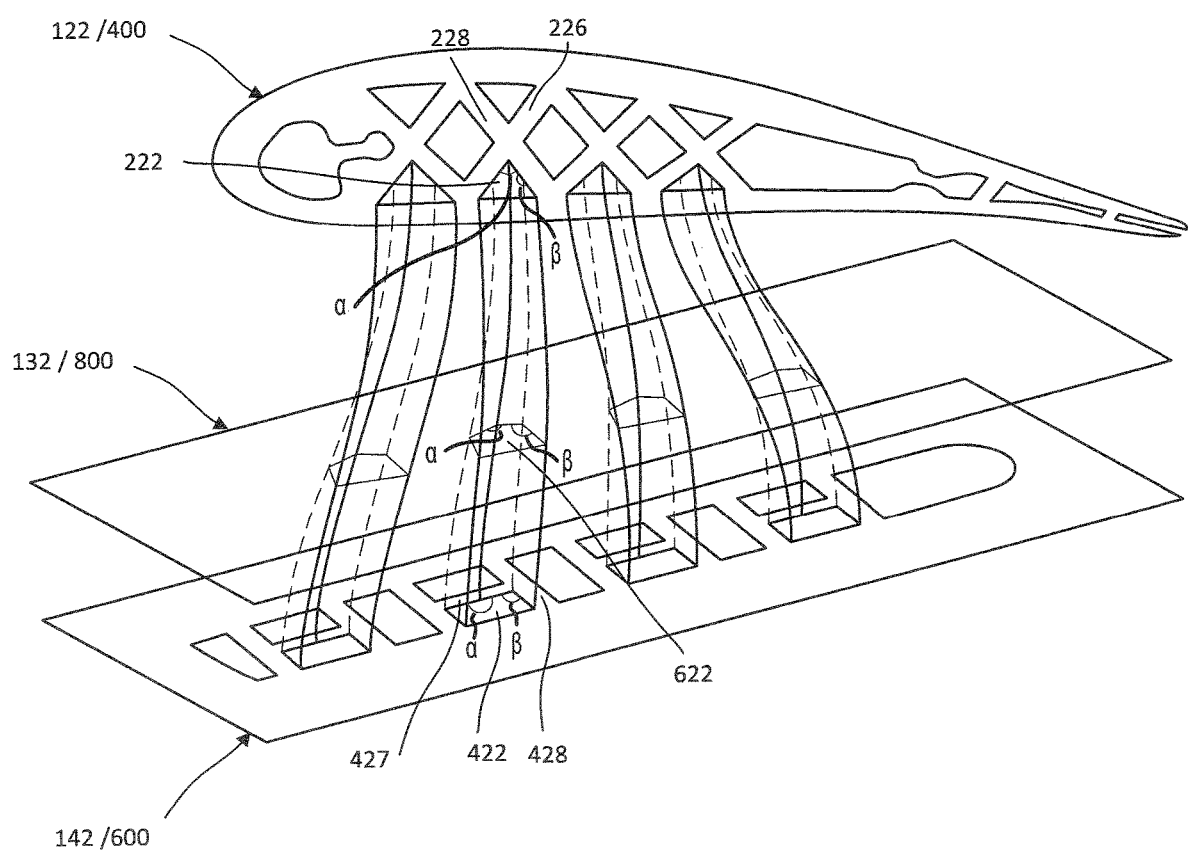
FIGS. 7B, and 7C illustrate an orthogonal view of a plurality of cavities extending from a radial attachment cross section to a radial airfoil cross section of a blade, in accordance with various embodiments.
Figure 7C:
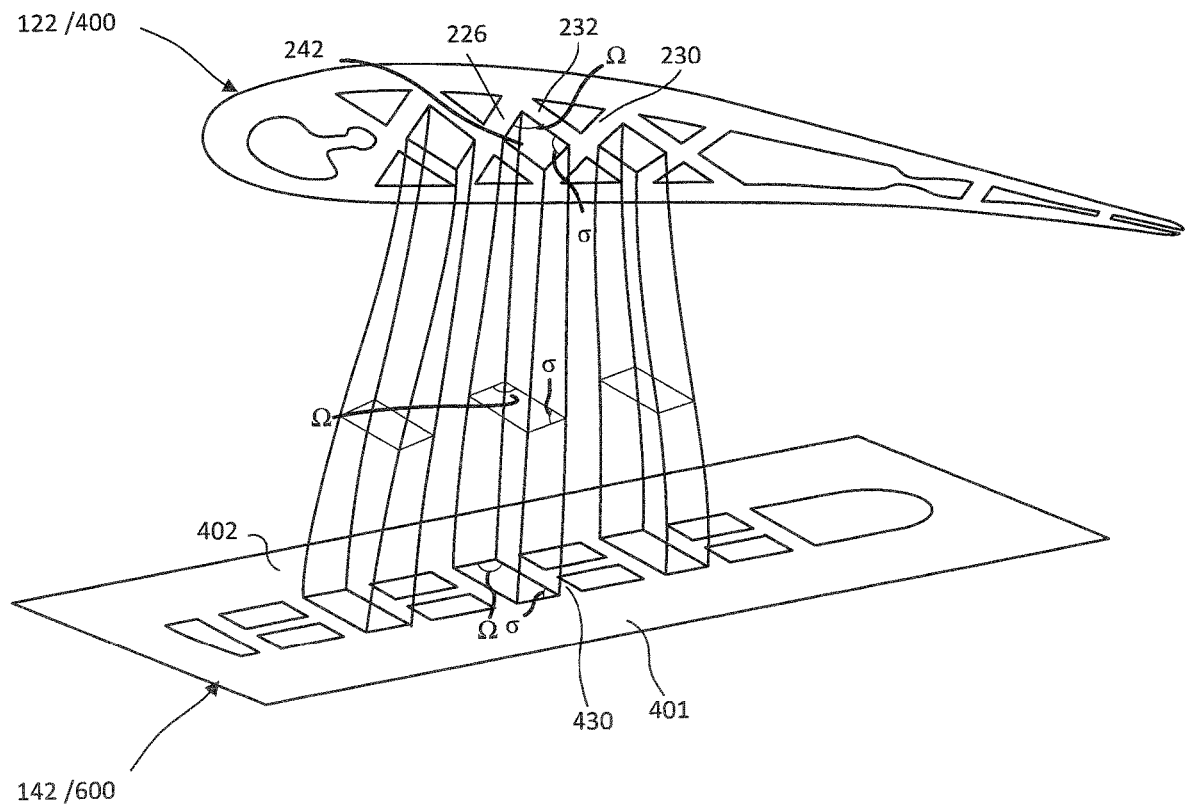

Referring to FIGS. 7B and 7C, a radial cavity transitioning from a radial airfoil plane 122 to a radial attachment plane 142 is shown in accordance with various embodiments. In airfoil cross sectional geometry 400, first airfoil rib 226 and second airfoil rib 228 define an angle $\alpha$. As shown, the angle $\alpha$ increases as first triangular cavity 222 transitions from radial airfoil plane 122 to radial attachment plane 142. Angle $\alpha$ may be substantially defined by second attachment rib 427 in attachment cross sectional geometry 600. In various embodiments, the angle $\alpha$ increases from about 30 degrees in radial airfoil plane 122 to about 180 degrees in radial attachment plane 142. In contrast, the angle $\beta$, defined by second airfoil rib 228 in the airfoil cross sectional geometry 400, decreases as first triangular cavity 222 transitions from radial airfoil plane 122 to radial attachment plane 142. Angle $\beta$ may be defined by the angle between second attachment rib 427 and third attachment rib 428 in attachment cross sectional geometry 600. In various embodiments, the angle $\beta$ may decrease from about 180 degrees in radial airfoil plane 122 to about 90 degrees in radial attachment plane 142. In various embodiments, a transitional radial plane 132 may have a transitional cavity 622. First triangular cavity 222 may transition through the transitional radial plane 132, where transitional cavity 622 may have a substantially pentagonal shape in transitional cross sectional geometry 800, and result in rectangular cavity 422 in radial attachment plane 142.

In airfoil cross sectional geometry 400, first airfoil rib 226 and fourth airfoil rib 232 define a rib angle $\Omega$. The angle $\Omega$ may increase as first internal cavity 242 transitions from radial airfoil plane 122 to radial attachment plane 142. Angle $\Omega$ may be defined by the angle between second circumferential wall 402 and fourth attachment rib 430 at the radial attachment plane 142. In various embodiments, the angle $\Omega$ may increase from about 30 degrees in radial airfoil plane 122 to about 90 degrees in radial attachment plane 142. In airfoil cross sectional geometry 400, third airfoil rib 230 and fourth airfoil rib 232 may define angle $\sigma$. The angle $\sigma$ may decrease as first internal cavity 242 transitions from radial airfoil plane 122 to radial attachment plane 142. Angle $\sigma$ may be defined by an angle between first circumferential wall 401 and fourth attachment rib 430 at the radial attachment plane 142. In various embodiments, the angle $\sigma$ may decrease from about 150 degrees in radial airfoil plane 122 to about 90 degrees in radial attachment plane 142.

Figure 9A:
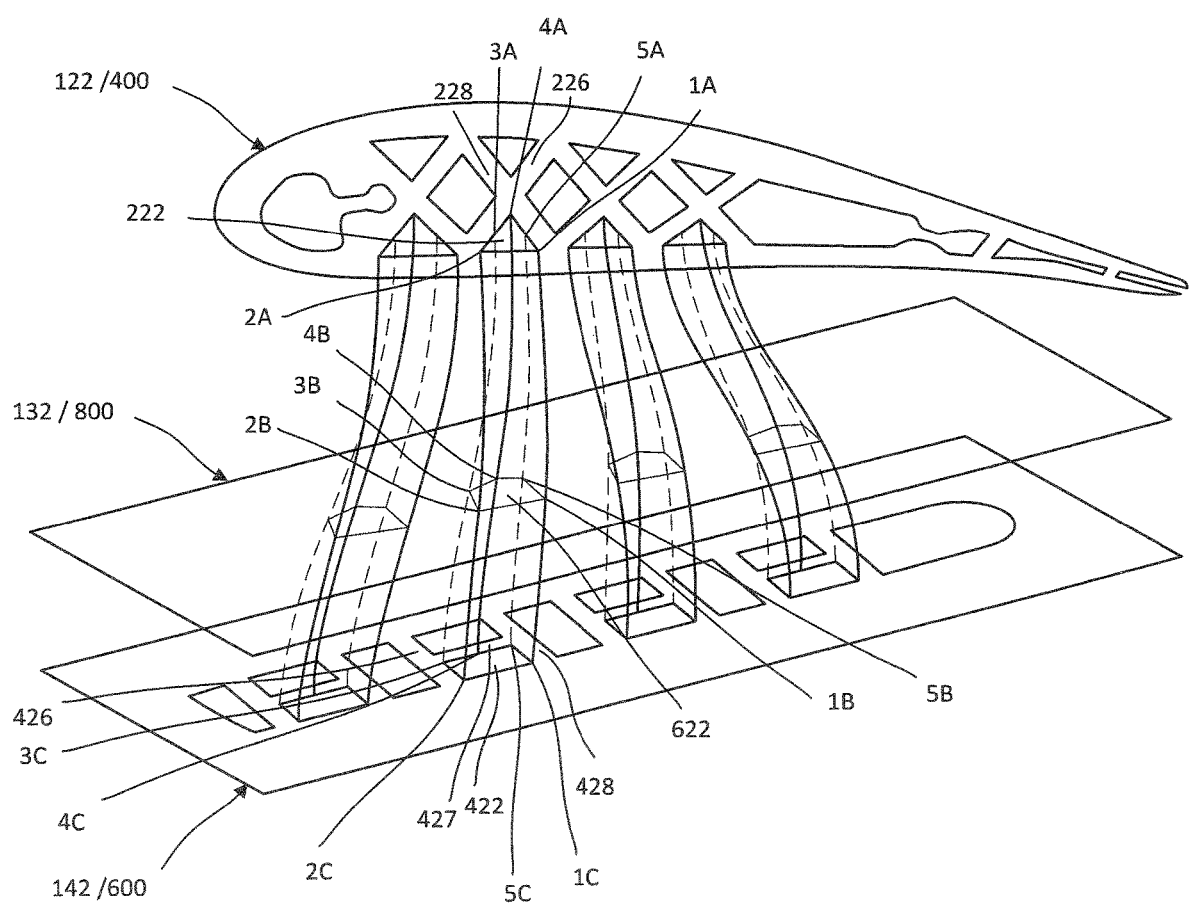
FIGS. 9A and 9B illustrate an orthogonal view of a plurality of cavities extending from a radial attachment cross section to a radial airfoil cross section of a blade, in accordance with various embodiments.

Referring now to FIG. 9A, the transition from airfoil ribs (226, 228) to attachment ribs (426,427,428) is further defined by airfoil control points (1A,2A,3A,4A,5A), transitional control points (1B,2B,3B,4B,5B), and attachment control points (1C,2C,3C,4C,5C). As shown, third airfoil control point 3A, fourth airfoil control point 4A, and fifth airfoil control point 5A are substantially non-linear. In various embodiments, third airfoil control point 3A, fourth airfoil control point 4A, and fifth airfoil control point 5A form a corner of a first triangular cavity 222. Airfoil control points (3A,4A,5A) may transition from substantially non-linear in airfoil cross sectional geometry 400 to near linear transitional control points (3B,4B,5B) in transitional cross sectional geometry 800 and result in substantially linear attachment control points (3C,4C,5C) in attachment cross sectional geometry 600. The substantially linear attachment control points (3C,4C,5C) form a side of rectangular cavity 422. In contrast, substantially linear airfoil control points (2A,3A,4A and 4A,5A,1A) that form sides of first triangular cavity 222 in airfoil cross sectional geometry 400 transition to nonlinear transitional control points (2B,3B,4B and 4B,5B,1B) in transitional cross sectional geometry 800 and become more non-linear control points (2C,3C,4C and 4C,5C,1C) to form corners of rectangular cavity 422 in attachment cross sectional geometry 600.

Figure 9B:
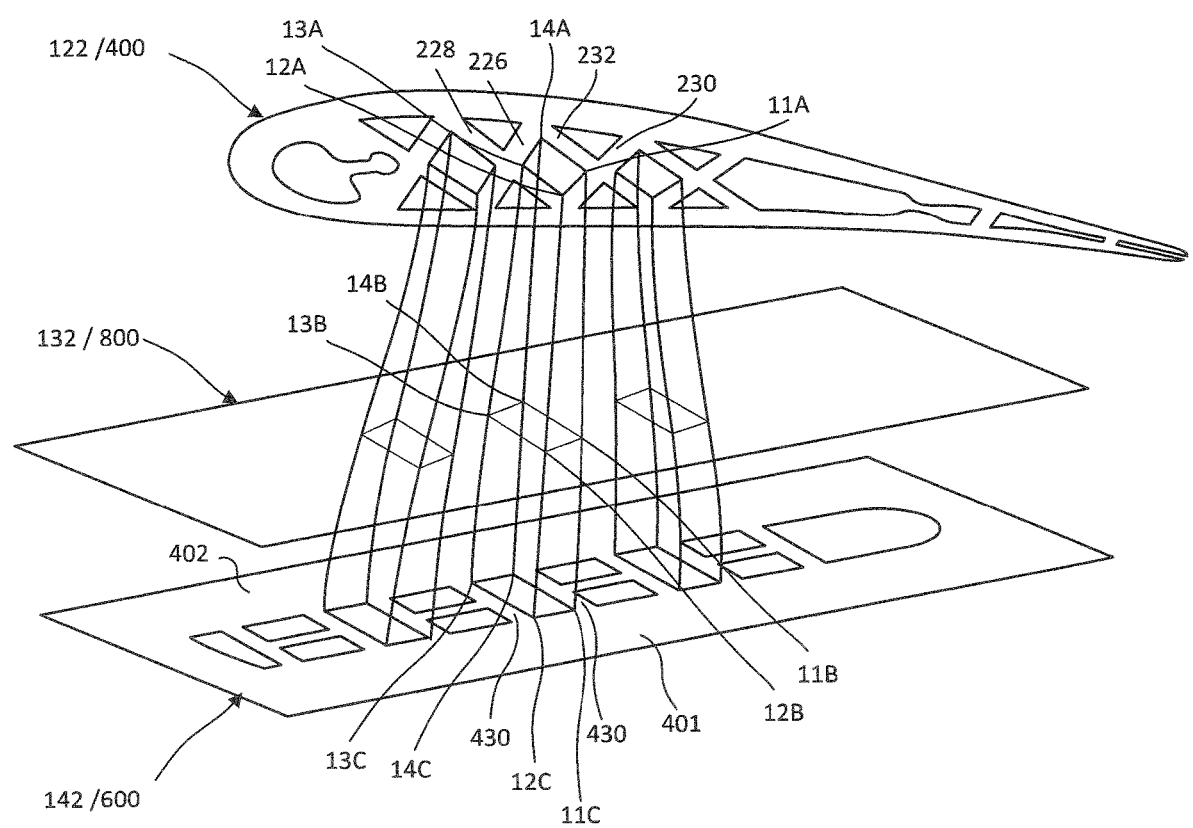

Referring now to FIG. 9B, the transition from airfoil ribs (226,228, 230,232) to partially form attachment ribs (426, 427,428) may be further defined by airfoil control points (11A,12A,13A,14A), transitional control points (11B,12B, 13B,14B), and attachment control points (11C,12C,13C, 14C). As shown, airfoil control points (11A,12A,13A,14A) may define a substantially parallelogram shape in airfoil cross sectional geometry 400 and may transition to transitional control points (11B,12B,13B,14B) defining a different parallelogram shape in transitional cross sectional geometry 800, and resulting in attachment control points (11C,12C, 13C,14C) defining a substantially rectangular shape.

Referring now to FIGS. 4A, 6A, 8A, and 8B various blades 800, 820 may have ribs having a modified truss structure that define cavities that are oriented in a similar manner as the ribs (210, 212, 410, 412) and cavities (216, 218, 220, 236, 240, 416, 418, 420, 436, 440) of the blade 102. The various blades 800 and 820 may further include additional cooling features.

Figure 8A:
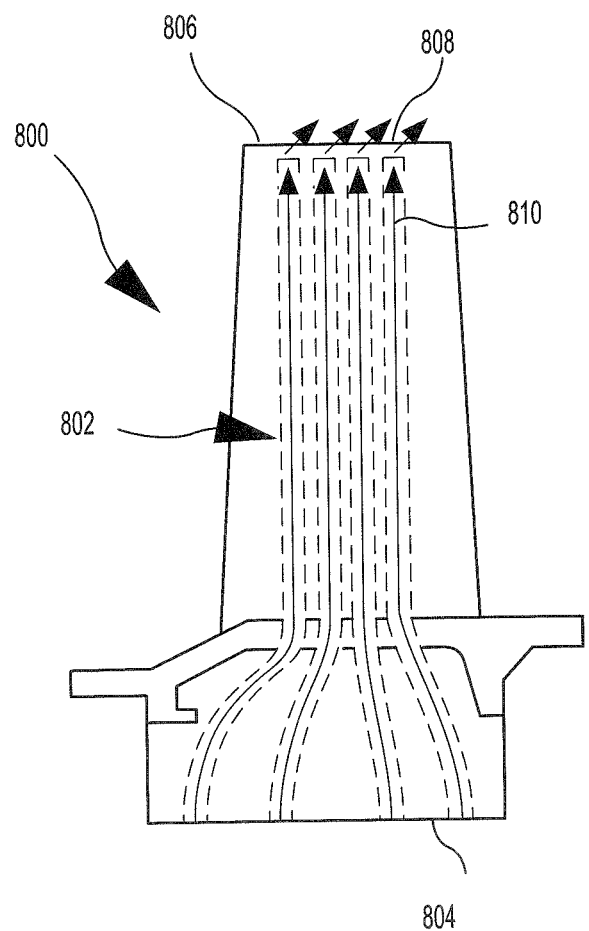
FIGS. 8A and 8B are cross-sectional views of various blades having transitional ribs from an attachment to an airfoil of a blade with various additional cooling features, in accordance with various embodiments.

For example and referring to FIG. 8A, the blade 800 may include radial cavities 802. The radial cavities 802 may receive air from an inner diameter edge 804. The air may flow radially outward through the radial cavities 802 and exit through tip holes 808 on an outer diameter edge 806 as shown by arrows 810. The radial cavities 802 may comprise a first plurality of rectangular cavities 416 in radial attachment plane 142 that transition into a first plurality of triangular cavities 216 in radial airfoil plane 122 and extend radially outward and exit through tip holes 808. The radial cavities 802 may further comprise a second plurality of rectangular cavities 418 in radial attachment plane 142 that transition into a second plurality of triangular cavities 218 in radial airfoil plane 122 and extend radially outward and exit through tip holes 808. Radial cavities 802 may further comprise a third plurality of rectangular cavities 420 in radial attachment plane 142 that transition into internal cavities 220 in radial airfoil plane 122 and extend radially outward and exit through tip holes 808.

Figure 8B:
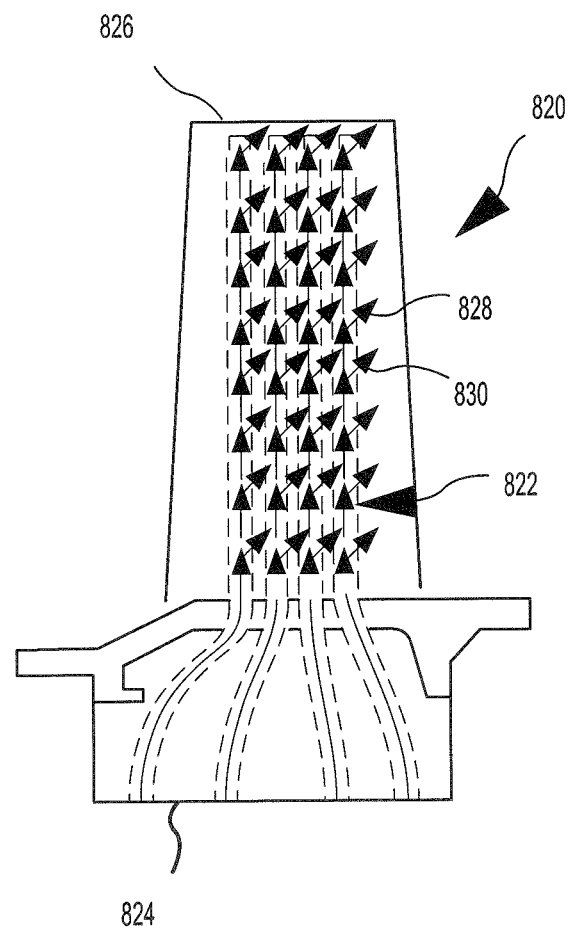

Referring to FIG. 8B, the blade 820 may include radial cavities 822 along with film holes 828. In that regard, the radial cavities 822 may receive air from an inner diameter edge 824. The air may flow radially outward through the radial cavities. The film holes 828 may be located along at least one of a pressure side wall or a suction side wall of the blade 820. In that regard, air from the radial cavities 822 exits the radial cavities 822 via the film holes 828 as it travels from the inner diameter edge towards an outer diameter edge 826 as shown by arrows 830.

Figure 10A:
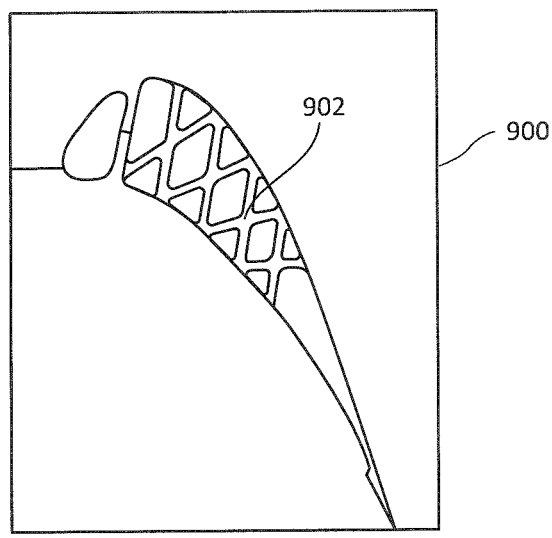
FIGS. 10A and 10B illustrate blade castings in accordance with various embodiments.

Referring to FIGS. 4A, 6A, and 10A the blade 102 may be formed using any technique. For example, the blade 102 may be formed via casting with use of a single core. In that regard, one or more sacrificial thermoplastic pieces 902 may be inserted into a core die 900. The core may be injected into the core die 900. After the core injection, the sacrificial thermoplastic pieces 902 may be melted out, leaving a single core to be inserted into a wax die.

Figure 10B:
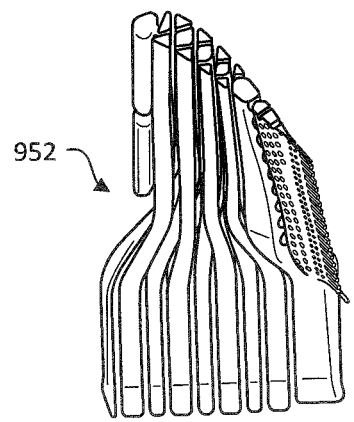

Referring to FIGS. 4A, 6A and 10B, the blade 102 may be formed via casting with multiple cores 952. In that regard, the cores 952 may be formed separately and then assembled into a wax die.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A blade, comprising:
   a set of intersecting ribs extending from a first radial plane of an airfoil to second radial plane of an attachment proximate a root, the set of intersecting ribs comprising a radial airfoil cross sectional geometry at the first radial plane and a radial attachment cross sectional geometry at the second radial plane, the radial airfoil cross sectional geometry being different from the radial attachment cross sectional geometry, wherein the set of intersecting ribs comprises a first rib and a second rib forming an angle, wherein the angle increases as the set of intersecting ribs transitions from the second radial plane of the attachment to the first radial plane of the airfoil.

2. The blade of claim 1, wherein the set of intersecting ribs further comprises:
a set of airfoil ribs comprising:
a first airfoil rib extending in a first direction within the radial airfoil cross sectional geometry;
a second airfoil rib extending in a second direction within the radial airfoil cross sectional geometry, the second direction being different from the first direction; and
a set of attachment ribs comprising:
a first attachment rib extending in a circumferential direction within the radial attachment cross sectional geometry;
a second attachment rib disposed aft of the first attachment rib and extending in the circumferential direction within the radial attachment cross sectional geometry;
a third attachment rib disposed between the first attachment rib and the second attachment rib and extending in an axial direction within the radial attachment cross sectional geometry, wherein
the set of airfoil ribs extends radially inward from the radial airfoil cross sectional geometry and transitions into the set of attachment ribs at the radial attachment cross sectional geometry.

3. The blade of claim 2, wherein the first airfoil rib transitions into a first portion of the first attachment rib, a first portion of the second attachment rib, and a first portion of the third attachment rib, and wherein the second airfoil rib transitions into a second portion of the first attachment rib, a second portion of the second attachment rib, and a second portion of the third attachment rib.

4. The blade of claim 3, wherein the first attachment rib consists of the first portion of the first attachment rib and the second portion of the first attachment rib, wherein the second attachment rib consists of the first portion of the second attachment rib and the second portion of the second attachment rib, and wherein the third attachment rib consists of the first portion of the third attachment rib and the second portion of the third attachment rib.

5. The blade of claim 2, further comprising an airfoil pressure wall, an airfoil suction wall, a first attachment wall, and second attachment wall disposed circumferentially opposite the first attachment wall,
wherein the first airfoil rib and the second airfoil rib define a first triangular cavity with the airfoil pressure wall within the radial airfoil cross sectional geometry,
wherein the first airfoil rib and the second airfoil rib define a second triangular cavity with the airfoil suction wall within the radial airfoil cross sectional geometry,
wherein the first attachment rib, the second attachment rib, the third attachment rib, and the first attachment wall define a first quadrilateral shaped cavity,
wherein the first attachment rib, the second attachment rib, the third attachment rib, and the second attachment wall define a second quadrilateral shaped cavity,
and wherein the first triangular cavity transitions into the first quadrilateral shaped cavity and the second triangular cavity transitions into the second quadrilateral shaped cavity as the set of airfoil ribs transitions to the set of attachment ribs.

6. The blade in claim 1, wherein the first rib and the second rib define a second angle that decreases as the set of intersecting ribs transitions from the first plane of the airfoil to the second radial plane of the attachment.

7. The blade of claim 1, wherein the set of intersecting ribs partially defines a cavity that is further defined by a first set of control points around a first perimeter of the cavity in the radial airfoil cross sectional geometry and a second set of control points around a second perimeter of the cavity in the radial attachment cross sectional geometry, wherein a first control point subset of the first set of control points transition from a first non-linear shape at the first radial plane in the radial airfoil cross sectional geometry to a first linear shape defined by a second control point subset of the second set of control points in the radial attachment cross sectional geometry at the second radial plane.

8. The blade of claim 7, wherein the first subset of control points form a first corner of the cavity in the airfoil and the second subset of control points form a side of the cavity in the attachment.

9. The blade of claim 8, wherein a third control point subset of the first set of control points transition from a second linear shape in the radial airfoil cross sectional geometry to a second non-linear shape defined by a fourth control point subset of the second set of control points at the radial attachment cross sectional geometry, wherein the third subset of control points form a side of the cavity in the airfoil and the fourth subset of control points form a second corner of the cavity in the attachment.

10. The blade of claim 7, wherein the first perimeter of the cavity is 3-sided and the second perimeter of the cavity is 4-sided.

11. A blade, comprising:
an airfoil having a leading edge and a trailing edge;
an attachment;
a first set of intersecting internal ribs defining a first angle that increases as the first set of intersecting internal ribs extend radially inward from the airfoil to the attachment, the first set of intersecting internal ribs comprising:
a set of airfoil ribs having a radial airfoil cross sectional geometry, the set of airfoil ribs comprising:
a first airfoil rib extending in a first direction within the radial airfoil cross sectional geometry;
a second airfoil rib extending in a second direction within the radial airfoil cross sectional geometry, the second direction being different from the first direction; and
a set of attachment ribs having a radial attachment cross sectional geometry, the set of attachment ribs comprising:
a first attachment rib extending in a circumferential direction within the radial attachment cross sectional geometry;
a second attachment rib disposed aft of the first attachment rib and extending in the circumferential direction within the radial attachment cross sectional geometry;
a third attachment rib disposed between the first attachment rib and the second attachment rib and extending in an axial direction within the radial attachment cross sectional geometry, wherein the set of airfoil ribs extends radially inward from the radial airfoil cross sectional geometry and transitions into the set of attachment ribs at the radial attachment cross sectional geometry;
a second set of intersecting internal ribs disposed aft of the first set of intersecting internal ribs;

a third set of intersecting internal ribs disposed aft of the second set of intersecting internal ribs; and
a fourth set of intersecting internal ribs disposed aft of the third set of intersecting internal ribs.

12. The blade of claim 11, wherein the first set of intersecting internal ribs further comprises a first rib aft surface and the second set of intersecting internal ribs further comprises a second rib forward surface, and wherein the first rib aft surface and the second rib forward surface partially define a first internal cavity.

13. The blade of claim 12, wherein the first internal cavity has a parallelogram shape in the radial airfoil cross sectional geometry, and wherein the first internal cavity has a substantially quadrilateral shaped shape in the radial attachment cross sectional geometry.

14. The blade of claim 11, wherein the first airfoil rib transitions into a first portion of the first attachment rib, a first portion of the second attachment rib, and a first portion of the third attachment rib.

15. The blade of claim 14, wherein the second airfoil rib transitions into a second portion of the first attachment rib, a second portion of the second attachment rib, and a second portion of the third attachment rib.

16. The blade of claim 15, wherein the first attachment rib consists of the first portion of the first attachment rib and the second portion of the first attachment rib, wherein the second attachment rib consists of the first portion of the second attachment rib and the second portion of the second attachment rib, and wherein the third attachment rib consists of the first portion of the third attachment rib and the second portion of the third attachment rib.

17. The blade of claim 11, wherein the first angle is acute at a first radial plane in the airfoil.

18. The blade of claim 11, wherein the first angle approaches 180 degrees at a second radial plane of the attachment.

19. The blade of claim 11, wherein a second angle is defined by an intersection of the first set of intersecting internal ribs and the second set of intersecting internal ribs, wherein the second angle increases as the first set of intersecting internal ribs and the second set of intersecting internal ribs extend from a first radial plane of the airfoil to a second radial plane of the attachment.

20. The blade of claim 19, wherein the second angle approaches 90 degrees at the second radial plane of the attachment.

21. A gas turbine engine, comprising:
a turbine rotor, the turbine rotor comprising:
a blade comprising:
an airfoil having a leading edge and a trailing edge;
an attachment coupled to a portion of the gas turbine engine;
a platform coupling the airfoil to the attachment;
a first set of intersecting internal ribs defining a first angle that increases as the first set of intersecting internal ribs extend radially inward from the airfoil to the attachment, wherein the first set of intersecting internal ribs further comprises:
a set of airfoil ribs having a radial airfoil cross sectional geometry, the set of airfoil ribs comprising:
a first airfoil rib extending in a first direction within the radial airfoil cross sectional geometry;
a second airfoil rib extending in a second direction within the radial airfoil cross sectional geometry, the second direction being different from the first direction; and
a set of attachment ribs having a radial attachment cross sectional geometry, the set of attachment ribs comprising:
a first attachment rib extending in a circumferential direction within the radial attachment cross sectional geometry;
a second attachment rib disposed aft of the first attachment rib and extending in the circumferential direction within the radial attachment cross sectional geometry;
a third attachment rib disposed between the first attachment rib and the second attachment rib and extending in an axial direction within the radial attachment cross sectional geometry, wherein the set of airfoil ribs extends radially inward from the radial airfoil cross sectional geometry and transitions into the set of attachment ribs at the radial attachment cross sectional geometry;
a second set of intersecting internal ribs disposed aft of the first set of intersecting internal ribs;
a third set of intersecting internal ribs disposed aft of the second set of intersecting internal ribs; and
a fourth set of intersecting internal ribs disposed aft of the third set of intersecting internal ribs.

22. The gas turbine engine of claim 21, wherein the blade further comprises an airfoil pressure wall and an airfoil suction wall, wherein the first airfoil rib and the second airfoil rib define a first triangular cavity with the airfoil pressure wall within the radial airfoil cross sectional geometry, and wherein the first airfoil rib and the second airfoil rib define a second triangular cavity with the airfoil suction wall within the radial airfoil cross sectional geometry.

23. The gas turbine engine of claim 21, wherein the blade further comprises a first attachment wall and a second attachment wall disposed circumferentially opposite the first attachment wall, wherein the first attachment rib, the second attachment rib, the third attachment rib, and the first attachment wall define a first quadrilateral shaped cavity.

24. The gas turbine engine of claim 23, wherein the first attachment rib, the second attachment rib, the third attachment rib, and the second attachment wall defines a second quadrilateral shaped cavity.

25. The gas turbine engine of claim 24, wherein the first triangular cavity transitions into the first quadrilateral shaped cavity and the second triangular cavity transitions into the second quadrilateral shaped cavity as the set of airfoil ribs transitions to the set of attachment ribs.

26. A blade, comprising:
a set of intersecting ribs extending from a first radial plane of an airfoil to second radial plane of an attachment proximate a root, the set of intersecting ribs comprising a radial airfoil cross sectional geometry at the first radial plane and a radial attachment cross sectional geometry at the second radial plane, the radial airfoil cross sectional geometry being different from the radial attachment cross sectional geometry, wherein the set of intersecting ribs further comprises:
a set of airfoil ribs comprising:
a first airfoil rib extending in a first direction within the radial airfoil cross sectional geometry;
a second airfoil rib extending in a second direction within the radial airfoil cross sectional geometry, the second direction being different from the first direction; and a set of attachment ribs comprising:
- a first attachment rib extending in a circumferential direction within the radial attachment cross sectional geometry;
- a second attachment rib disposed aft of the first attachment rib and extending in the circumferential direction within the radial attachment cross sectional geometry;
- a third attachment rib disposed between the first attachment rib and the second attachment rib and extending in an axial direction within the radial attachment cross sectional geometry, wherein the set of airfoil ribs extends radially inward from the radial airfoil cross sectional geometry and transitions into the set of attachment ribs at the radial attachment cross sectional geometry.

27. A blade, comprising:
a set of intersecting ribs extending from a first radial plane of an airfoil to second radial plane of an attachment proximate a root, the set of intersecting ribs comprising a radial airfoil cross sectional geometry at the first radial plane and a radial attachment cross sectional geometry at the second radial plane, the radial airfoil cross sectional geometry being different from the radial attachment cross sectional geometry, wherein the set of intersecting ribs comprises a first rib and a second rib and wherein, a first angle is defined by an intersection of the first rib and the second rib, wherein the first angle increases as the set of intersecting ribs transitions from the first radial plane of the airfoil to the second radial plane of the attachment, and wherein the first rib and the second rib define a second angle that decreases as the set of intersecting ribs transitions from the first radial plane of the airfoil to the second radial plane of the attachment.

* * * * *